United States Patent Office 3,496,842
Patented Feb. 24, 1970

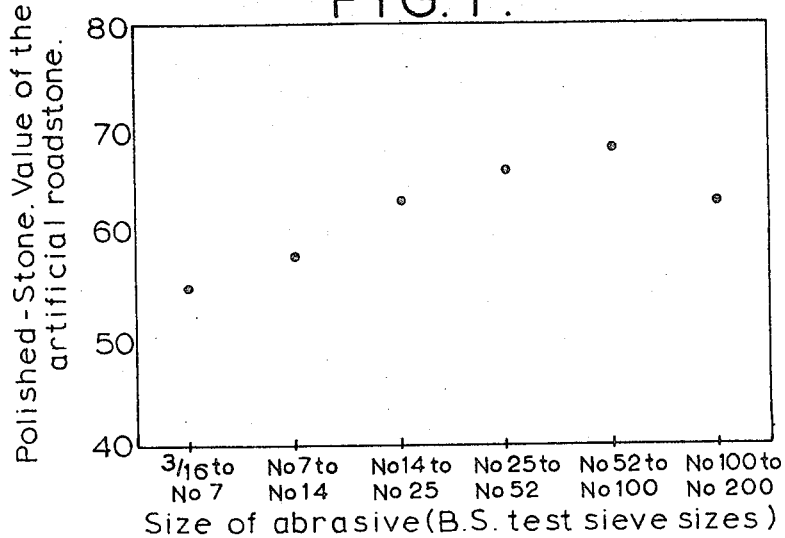
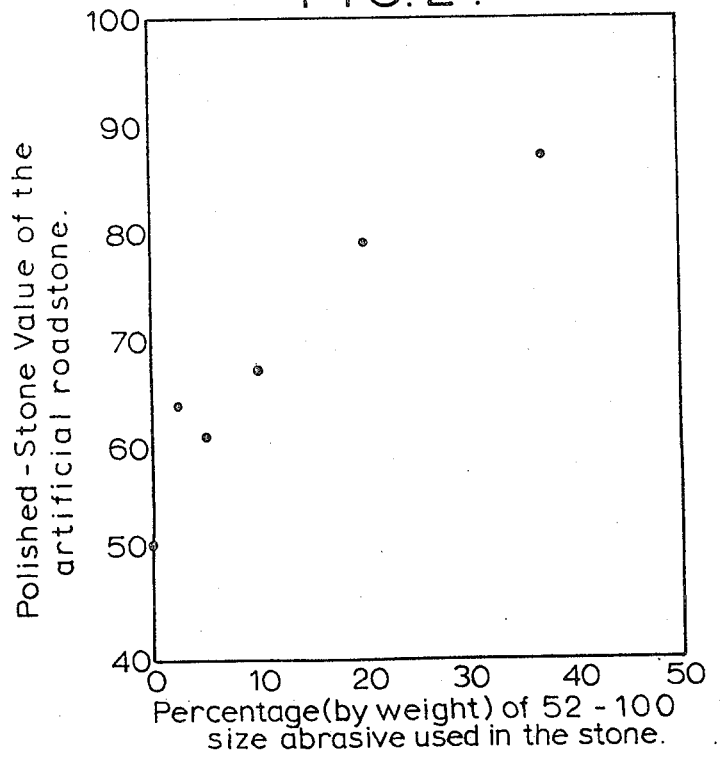

3,496,842
ARTIFICIAL ROADSTONE
John Gilbert James and John Roger Hosking, Crowthorne, England, assignors to National Research Development Corporation, London, England
Filed Aug. 20, 1968, Ser. No. 754,069
Claims priority, application Great Britain, Aug. 24, 1967, 38,630/67
Int. Cl. E01c 11/01, 7/30
U.S. Cl. 94—19                                10 Claims

ABSTRACT OF THE DISCLOSURE

Artificial roadstones are provided which comprise a water insoluble hard abrasive material bonded in a matrix of a softer water insoluble material. The roadstones have higher Polished Stone Values than conventional roadstones.

---

Roadstones to be used for the surface treatment of difficult road sites and heavily trafficked roads require high Polished Stone Values (PSV's), in order to prevent repeated skidding accidents. Although natural roadstones are available which will meet these requirements, the number of sources of such stones is very limited and their PSV's are mostly at, or only just above, the minimum requirements. The geographical location of these sources is often such that distribution to the site of use is difficult and haulage costs are high.

The roadstone provided by the present invention comprises an artificial roadstone comprising a water insoluble hard abrasive material having a hardness on the Moh scale of at least six, bonded in a matrix of a softer water insoluble material having a hardness less than that of the abrasive material but at least three on the Moh scale, the abrasive material being bonded in the matrix in such a way that the effect of abrasion on the roadstone is predominantly to wear away the matrix and not to break the bond between the abrasive material and the matrix. Roadstones according to the invention have higher PSV's than natural roadstone and consequently provide higher resistance to skidding and longer effective life.

The abrasive material used for making the roadstone should be insoluble in water and have a hardness of at least six when measured on the Moh scale (or a Knoop hardness of at least 600). Suitable materials include calcined bauxite, quartz, garnet, cordierite, emery, sillimanite, calcined kyanite and waste industrial products such as crushed broken grinding wheels and crushed refractory bricks.

The material for use as a matrix should be insoluble in water and have a hardness less than that of the abrasive material; but not less than three on the Moh scale (Knoop hardness of 150). Suitable materials to be used as matrices include ceramics, glasses, hydraulic cement mortars, plastics, industrial slags, hardened materials based on soluble silicates, clays and sintered waste products such as flyash and aluminium waste products. The particle size of the abrasive material should preferably be from 2.5 mm. to 50 microns, advantageously from 1 mm. to 75 microns.

The effect of varying the size range of the abrasive material on the Polished Stone Value of one type of roadstone is shown in FIGURE 1 of the accompanying drawings. This roadstone was prepared by admixing 10 percent by weight of calcined bauxite with a matrix of hydraulic cement/limestone mortar. The roadstone was prepared by adding the bauxite to a mixture of 1 part by weight of a high alumina cement with 2 parts by weight of limestone (passing through a 150 micron B.S. sieve). The aggregate was mixed dry. Water was added, the final mixture was poured into moulds, vibrated and allowed to set. The cast blocks were later crushed and sieved to the required size. This test is given to illustrate the effect of the size of the abrasive grit only, and does not necessarily provide artificial stones suitable for road making purposes.

The proportion of abrasive material in the roadstone may be between 5 and 75 percent by weight. The preferred proportion is between 10 and 30 percent. The effect of varying the proportion of the abrasive material on the Polished Stone Value of the resultant roadstone is shown in FIGURE 2 of the accompanying drawings. For these tests varying proportions of calcined bauxite graded between 300–150 microns B.S. sieve sizes were mixed with a matrix of hydraulic cement/limestone mortar. The roadstone was prepared as in the previous test.

The roadstone may be prepared in various ways, the exact method being determined by the type of matrix used. The abrasive material may, for instance, be mixed with molten slag either by mechanical mixing or by enjoining a stream of molten slag with a stream of abrasive material carried if necessary by a fluid such as air. In some circumstances, it is desirable to mix the abrasive material with previously cooled and crushed slag which may then be remelted or partially remelted to obtain the desired combination.

When the matrix consists of a material such as clay, which is initially in a plastic or semi-plastic state, the mixture could be incorporated by mechanical means. Suitable fluxes may be added to control the final properties of the stone. The mixture can then be pressed, moulded or extruded into rough bricks or bars and heated in stacks in a stationary kiln. Alternatively, lumps or pellets of the mixture can be fed through a drum heater of either the rotary or moving belt type. To prevent unwanted expansion of the roadstone due to the emission of steam or gases which might occur under rapid heating, it may be necessary to submit the mixture to a pre-drying process before the final firing. The resulting stone is then crushed and graded to the sizes required for road use.

After incorporating the abrasive material with the matrix material and processing the mixture, the resultant roadstone should have the following mechanical properties:

|  | Absolute limit | Preferred limit |
| --- | --- | --- |
| Ten percent fines value minimum | 8 | 10 |
| Crushing strength, lb./sq. in (minimum) | 5,000 | 15,000 |
| Aggregate abrasion value (maximum) | 20 | 12 |
| Polished stone value (minimum) | 45 | 65 |

For special purposes further desirable physical characteristics may be imparted to the roadstone by careful selection of the raw materials or by the use of additional constituents. For instance, a roadstone with enhanced light reflecting properties is obtained by using white china clay as the matrix material. Directional light reflection may be achieved by incorporating small quantities of glass spheres ("ballotini") into the mixture. In this case, the conditions of mixing and formation of the roadstone should be such that the glass spheres are not unduly crushed or deformed in the process. Coloured stones may be made by suitable pigmentation.

The mechanical properties of the roadstone and its constituents have been assessed by test methods given in B.S. 812: 1960, "The sampling and testing of mineral aggregates and fillers" and Amendment No. 3 (1965) to this standard.

The invention is illustrated by the following examples:

EXAMPLE 1

10 percent by weight of calcined bauxite (size 300–150 microns) was added to molten blast furnace slag contained in a rotary furnace held at about 1400° C. The mixture was poured into a mould, cooled, crushed and screened. The resultant roadstone had a PSV of 65.

EXAMPLE 2

20 percent by weight calcined bauxite (size 300–150 microns) was added to a mortar consisting of 1 part by weight of high alumina cement to 2 parts by weight of limestone. The mixture was treated as described previously. The resultant roadstone had a PSV of 79.

EXAMPLE 3

10 percent by weight of calcined bauxite (300–150 microns) was added to a mixture of 90 percent by weight of Etruria marl and 10 percent by weight of feldspar. The whole was mechanically mixed, pressed into moulds, air dried, fired at 1200° C. for 4 hours, cooled, crushed and sieved. The resultant roadstone had a PSV of 77.

We claim:

1. An artificial roadstone comprisng a water insoluble hard abrasive material bonded in a matrix of a softer water insoluble material, said abrasive material having a hardness on the Moh scale of at least six, said softer material having a hardness less than that of said abrasive material but at least three on the Moh scale and the nature of the bond between said abrasive material and said matrix being such that the effect of abrasion on said roadstone is predominantly to wear away said matrix whilst leaving said bond between said abrasive material and said matrix unbroken.

2. An artificial roadstone as claimed in claim 1 wherein the size range of said abrasive material is from 2.5 mm. to 50 microns.

3. An artificial roadstone as claimed in claim 1 containing from 5 to 75% by weight of said abrasive material.

4. An artificial roadstone as claimed in claim 1 wherein said abrasive material is calcined bauxite.

5. An artificial roadstone as claimed in claim 1 wherein said matrix is a ceramic material.

6. An artificial roadstone as claimed in claim 1 wherein said matrix is a slag, fired clay or sintered waste material.

7. An artificial roadstone as claimed in claim 1 wherein said matrix is blast furnace slag.

8. An artificial roadstone comprising from 10 to 30% by weight of a water insoluble hard abrasive material bonded in a matrix of a softer water insoluble material, said abrasive material having a hardness on the Moh scale of at least six and a size range from 1 mm. to 75 microns, said softer material having a hardness less than that of said abrasive material but at least three on the Moh scale and the nature of the bond between said abrasive material and said matrix being such that the effect of abrasion on said roadstone is predominantly to wear away said matrix whilst leaving said bond between said abrasive material and said matrix unbroken.

9. An artificial roadstone as claimed in claim 8 wherein said abrasive material is calcined bauxite.

10. An artificial roadstone as claimed in claim 8 wherein said matrix is blast furnace slag.

References Cited

UNITED STATES PATENTS

| | | | |
|---|---|---|---|
| 3,051,590 | 8/1962 | Proux | 94—19 X |
| 3,334,555 | 8/1967 | Nagin | 94—22 X |
| 3,407,165 | 10/1968 | Oepkes et al. | 94—22 X |
| 3,417,676 | 12/1968 | Lenoble | 94—15 X |

NILE C. BYERS, JR., Primary Examiner